Oct. 10, 1961  H. M. GEYER  3,003,470
ACTUATOR WITH VARIABLE POSITION STROKE LIMITER
Filed May 16, 1960  2 Sheets-Sheet 1

INVENTOR.
Howard M. Geyer
BY
W. E. Finken
His Attorney

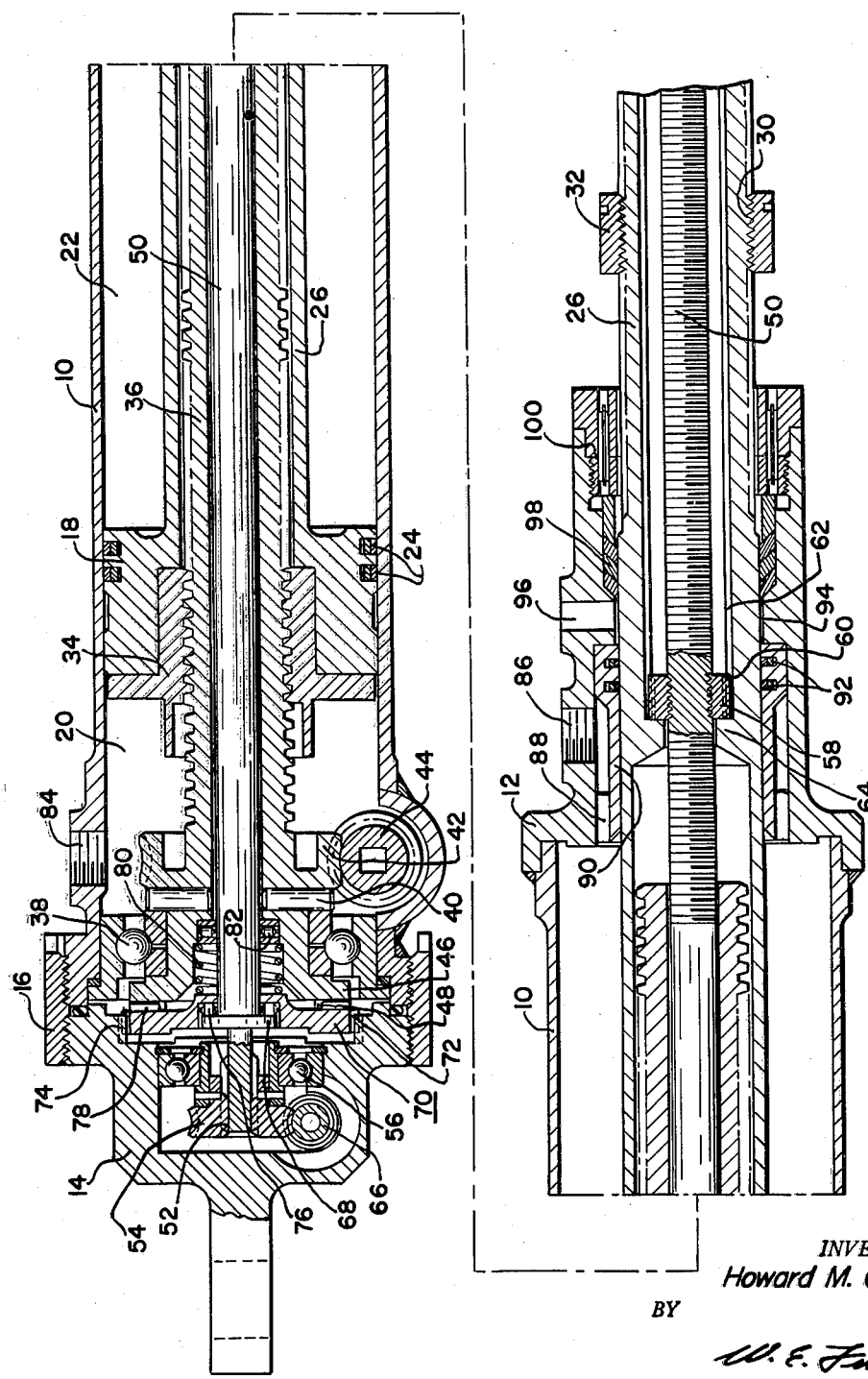

United States Patent Office 3,003,470
Patented Oct. 10, 1961

3,003,470
ACTUATOR WITH VARIABLE POSITION STROKE LIMITER
Howard M. Geyer, Dayton, Ohio, assignor to General Motors Corporation, Detroit, Mich., a corporation of Delaware
Filed May 16, 1960, Ser. No. 29,313
11 Claims. (Cl. 121—40)

This invention relates to actuators, and particularly to a fluid pressure operated actuator having a stroke limiter.

Heretofore, fluid pressure operated actuators of the linear type have embodied stroke limiting means for positively precluding movement of the actuator under load in one direction upon failure of the fluid pressure system for operating the actuator. The present invention relates to a fluid pressure operated actuator having adjustable stroke limiting means, the actuator being of the linear type and specifically designed for applications wherein it is normally subjected to tension loads. Accordingly, among my objects are the provision of a fluid pressure operated actuator of the linear type having adjustable stroke limiting means; the further provision of a hydraulic actuator having stroke limiting means which are internally adjustable; and the still further provision of an actuator assembly of the linear type having stroke limiting means and means for positively locking the actuator against movement upon engagement of the movable member of actuator with the stroke limiting means.

The aforementioned and other objects are accomplished in the present invention by embodying a pair of coaxial screw shafts within the actuator in combination with means for restraining rotation of one of the screw shafts to lock the actuator against movement. Specifically, the actuator comprises a cylinder having a reciprocable piston therein dividing the cylinder into an extend chamber and a retract chamber. A pair of screw shafts are journalled within the cylinder, one of the screw shafts being hollow and the other screw shaft being coaxially disposed therein. The hollow screw shaft is engaged by a nut attached to the piston for movement therewith. Accordingly, movement of the piston is accompanied by, and is dependent upon, rotation of the hollow screw shaft. This hollow screw shaft may be connected to a worm gear that meshes with a worm whereby a plurality of like actuators can be mechanically synchronized. The hollow screw shaft is also formed with a locking flange having a plurality of serrations, or dog teeth, thereon.

The second screw shaft is supported for limited axial movement relative to the cylinder as well as for rotation relative thereto. The second screw shaft extends into the hollow piston rod integral with the actuator piston and threadedly engages a nut. The nut has a straight spline connection with the piston rod whereby rotation thereof is precluded. This nut constitutes an adjustable stroke limiting device, and to facilitate adjustment of the nut, the second screw shaft may be drivingly connected to a servo motor whereby rotation of the second screw shaft will adjust the position of the stroke limiting nut.

In addition, the second screw shaft is engageable with an axially moveable locking element having a plurality of circumferentially spaced dog teeth engageable with the dog teeth on the hollow screw shaft. The second locking element is axially movable and has a straight spline connection with the cylinder so as to be restrained against rotation. In addition, the second locking element is normally maintained out of engagement with the locking surfaces on the hollow screw shaft by a spring.

In operation, the stroke limiting nut is positioned by the external servo motor at the desired stroke limiting position for the particular application in which the actuator is to be used. The actuator is designed for use in a system wherein the piston is subjected to a tension load. Accordingly, the actuator piston is movable between a fully retracted position and an extended position determined by the position of the stroke limiting nut. If the fluid pressure system for operating the actuator should malfunction, the tension load will effect extending movement of the actuator piston until an abutment on the piston rod engages the stroke limiting nut. Upon engagement of the piston rod abutment and the stroke limiting nut, the second screw shaft is moved axially to engage the dog tooth clutch, or lock, thereby positively restraining rotation of the hollow screw shaft and thus locking the actuator piston against further movement in the extend direction due to the external tension load. The locking torque is imposed upon the coengaging clutch members, and accordingly, no appreciable forces are taken by the piston rod and the stroke limiting nut.

Further objects and advantages of the present invention will be apparent from the following description, reference being had to the accompanying drawings, wherein a preferred embodiment of the present invention is clearly shown.

In the drawings:

FIGURE 2 is a view similar to FIGURE 1 with the actuator piston in an extended position engaging the stroke limiting nut with the locking means engaged.

Figure 1:
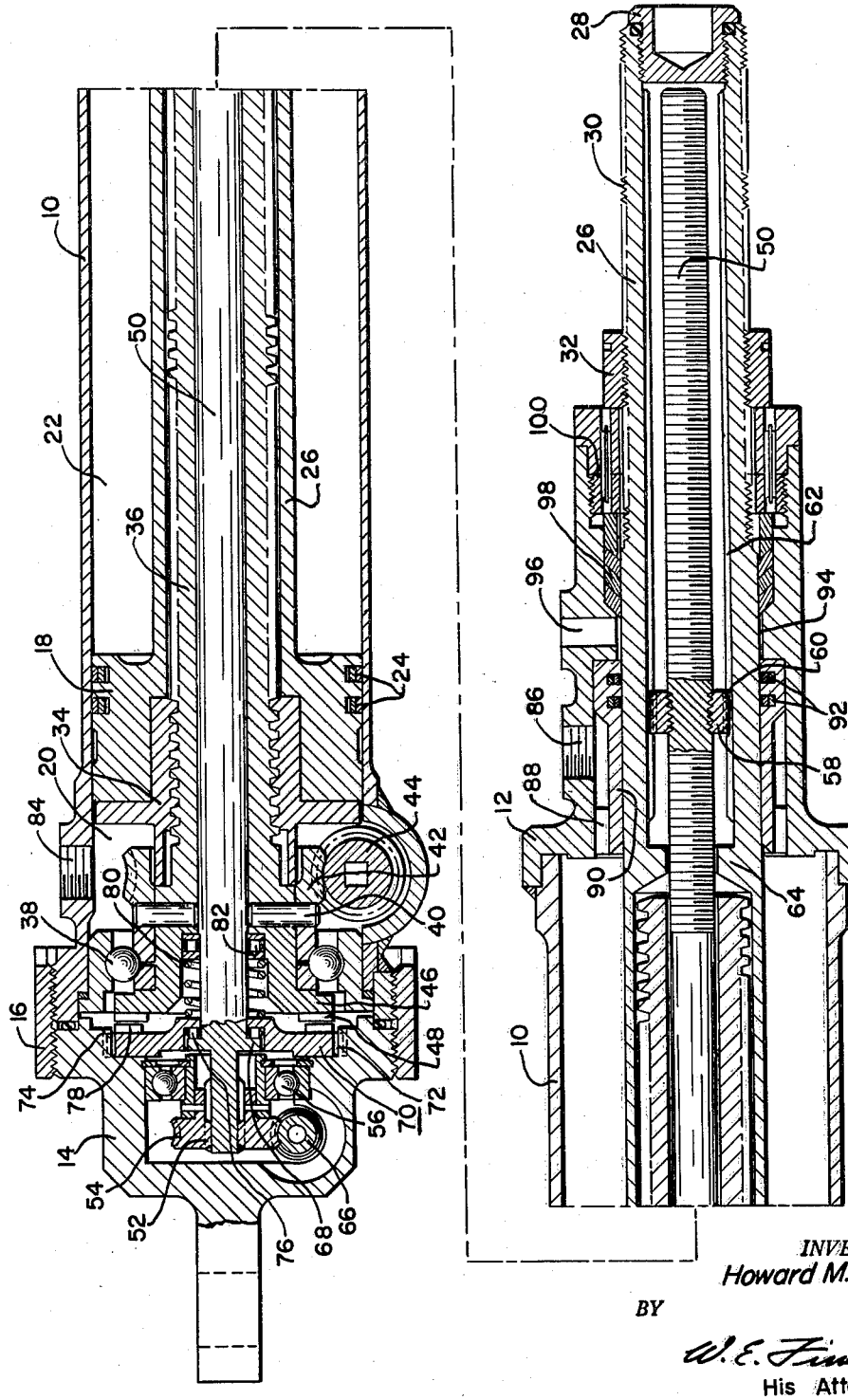
FIGURE 1 is a longitudinal sectional view of an actuator constructed according to the present invention with the actuator piston fully retracted.

With particular reference to the drawings, the actuator comprises a cylinder 10 having a tail cap 12 welded thereto and a head cap 14 attached thereto by a torque resisting threaded coupling 16. The head cap 14 is adapted to be attached to a suitable fixed support, not shown. The cylinder 10 contains a piston 18 supported for reciprocable movement therein, and dividing the cylinder into an extend chamber 20 and a retract chamber 22. The piston carries spaced sets of suitable metallic piston rings 24 which sealingly engage the inner wall of the cylinder 10. As disclosed, the piston 18 is integral with a hollow axially extending piston rod 26 which extends into the tail cap 12 and has its outer end closed by a threaded plug 28. A portion of the outer periphery of the hollow piston rod 26 is threaded, as indicated by numeral 30, and a stroke adjusting nut 32 engages the threads 30 for determining the full retract position of the actuator piston 18, in a manner to be described hereinafter.

The piston 18 carries a nut 34, the nut 34 being rigidly connected to the piston 18. The nut 34 threadedly engages a hollow acme screw shaft 36, constituting a rotatable member, journalled in the cylinder assembly by a combined radial and thrust bearing 38. The hollow screw shaft 36 is coaxially disposed within the hollow piston rod 26, and is connected by pins 40 to a worm gear 42. Accordingly, reciprocation of the piston 18 effects rotation of the screw shaft 36 and the worm gear 42. The worm gear 42 meshes with a worm 44 which can be connected to a suitable flexible shaft so as to mechanically synchronize a plurality of like actuators.

In addition, the inner end of the hollow screw shaft 36 is formed with a flange 46 having a plurality of circumferentially spaced dog teeth 48 thereon. The hollow screw shaft 36 is restrained against axial movement relative to the cylinder 10.

A second screw shaft 50, constituting a rotatable member, is coaxially disposed within the hollow screw shaft 36 and extends into the hollow piston rod 26. The screw shaft 50 is capable of limited axial movement relative to the screw shaft and has a straight spline connection at 52 with a worm gear 54. The worm gear 54 is supported for rotation relative to the head cap 14 by a combined radial and thrust bearing 56. The screw shaft 50 is engaged by a nut 58, constituting a nonrotatable element, having external straight spline teeth 60 engageable with internal straight spline teeth 62 formed on a portion of the hollow piston rod 26. The piston rod 26 is restrained against rotation relative to the cylinder 10 by its connection with a load device, not shown. Accordingly, the nut 58 is restrained against rotation by reason of its straight splined connection therewith. However, the nut 58 is axially adjustable along the length of the screw shaft 50, which adjustment can be effected by rotating the screw shaft 50.

The nut 58 constitutes an adjustable stroke limiting device which determines the maximum extend position of the actuator piston 18. In order to achieve this result, the piston rod 26 is formed with an internal shoulder, or abutment, 64 which is engageable with the nut 58. In order to adjust the position of the nut 58, the worm gear 54 meshes with a worm 66 which is adapted to be connected to a suitable rotary servo motor, for instance a hydraulic motor, through a flexible shaft, not shown. Moreover, in a synchronized actuator installation, the worm 66 of each actuator is connected to the same flexible shaft so that the positions of the stroke limiting nuts 58 can be simultaneously adjusted.

As alluded to hereinbefore, the screw shaft 50 is supported for axial movement relative to the cylinder 10, and as shown in the drawings, is formed with an integral collar, or shoulder, 68. An annulus 70 having exterior straight spline teeth 72 engaging straight spline teeth 74 on the head cap 14, is disposed within the head cap 14 and spaced from the shoulder 68 by a thrust bearing 76. The annulus 70 is restrained against rotation relative to the cylinder assembly, although capable of axial movement relative thereto. The annulus 70 has a complementary set of circumferentially spaced dog teeth 78 engageable with the dog teeth 48 on the flange 46 of the hollow screw shaft 36. The annulus 70 is normally positioned so that the dog teeth 78 are disengaged from the dog teeth 48 by a spring 80, one end of which engages the annulus 70, and the other end of which engages a thrust bearing assembly 82.

The actuator disclosed herein is designed for use in installations wherein the piston rod 26 is subjected to tension load. The extend chamber 20 is connected to an extend port 84, and the retract chamber 22 is connected to a retract port 86. The retract port 86 communicates with the retract chamber 22 through a plurality of passages 88 formed in a flange on a bushing 90 which slidably supports the piston rod 26. The bushing 90 also supports a pair of metallic piston ring assemblies 92 which engage the piston rod 26 and permit a limited amount of fluid under pressure to leak from the retract chamber 22 to an annular chamber 94. The annular chamber 94 is connected to a drain port 96. The piston rod 26 is engaged by a plurality of low pressure seals 98 which are held in assembled relation with the tail cap 12 by a nut assembly 100 with which the stroke adjusting nut 32 is engageable to determine the full retract position of the piston 18.

Operation of the actuator is as follows. When the extend chamber 20 is subjected to the pressure and the retract chamber 22 is connected to drain, the piston 18 and the nut 34 move to the right as viewed in FIGURE 1. Linear movement of the piston 18 and the nut 34 imparts rotation to the hollow screw shaft 36 which in turn rotates the worm gear 42 and the worm 44. The maximum extend position of the actuator piston 18 is determined by the position of the stroke limiting nut 58. As seen in FIGURE 2, the abutment 64 on the piston rod 26 has engaged the stroke limiting nut 58. Continued application of pressure to the extend chamber 20 after engagement of the abutment 64 with the stroke limiting nut 58 will result in axial movement of the screw shaft 50 to the right, as viewed in FIGURE 1, to the position of FIGURE 2 thereby affecting movement of the locking annulus 70 to the right so that the dog teeth 78 on the annulus 70 engage the dog teeth 48 on the flange 46 thereby mechanically locking the hollow screw shaft 36 against rotation. In this manner, the piston 18 is positively locked against further movement to the right, as viewed in FIGURE 2, and the locking torqe is taken up by the dog teeth 78 and 48 of the clutch, or locking, means.

Similarly, if the hydraulic system for operating the actuator should malfunction, thereby causing the actuator piston 18 to extend due to the external tension load, movement of the actuator piston 18 will be arrested as soon as the shoulder 64 engages the stroke limiting nut 58. Thus, as soon as the shoulder 64 engages the nut 58 the screw shaft 50 will be moved axially to the right so as to move the locking annulus 70 into engagement with the flange 46 thereby locking the hollow screw shaft 36 against rotation to preclude further movement of the piston 18 in the extend direction. The position of the stroke limiting nut 58 can be adjusted at any time by actuation of the servo motor, not shown, for rotating the worm 66, the worm gear 64 and the screw shaft 50.

The locking means constituted by the intermeshing dog teeth 78 and 48 on the annulus 70 and the flange 46, respectively, will be automatically released upon the application of fluid under pressure to the retract chamber 22 while the extend chamber 20 is connected to drain. The locking means will be released since as soon as the tension load on the piston is overcome by the pressure in the retract chamber 22, the spring 80 will move the screw shaft 50 and the annulus 70 to the left from the position of FIGURE 2 to the position of FIGURE 1 thereby disengaging the teeth 78 on the annulus 70 from the teeth 48 on the flange 46. In this manner, the hollow screw shaft 36 is free to rotate thereby permitting movement of the actuator piston 18 to the left, as viewed in FIGURE 2.

While the embodiment of the invention as herein disclosed constitutes a preferred form, it is to be understood that other forms might be adopted.

What is claimed is as follows:

1. An actuator assembly including in combination, a cylinder, a reciprocable piston disposed within the cylinder, a member rotatably supported in the cylinder, a nonrotatable element operatively engaging said member so as to move axially upon rotation of said member, said element being operatively engageable with said piston for limiting movement thereof in one direction, and means operable to rotate said member and adjust the axial position of said member to vary the stroke limit of said piston in said one direction.

2. An actuator assembly including in combination, a cylinder, a reciprocable piston disposed within said cylinder, a first member rotatably journalled in said cylinder and operatively connected to said piston such that piston movement is dependent upon and effects rotation of said member, a second member rotatably journalled in said cylinder, a nonrotatable element operatively engaging said second member whereby rotation of said second member will impart axial movement to said element, said piston being operatively engageable with said element whereby said element limits movement of said piston in one direction, locking means disposed within said cylinder and engageable with said first rotatable member to prevent rotation thereof and lock said piston against movement, means operatively interconnecting said locking means and said second rotatable member whereby operative engagement of said piston with said element engages said locking means, and means for imparting rotation to said second rotatable member to vary the stroke limit of said piston in said one direction.

3. An actuator assembly including in combination, a cylinder, a reciprocable piston disposed in said cylinder, a first member rotatably journalled in said cylinder and operatively connected to said piston such that piston movement is dependent upon and effects rotation of said member, a second member rotatably journalled in said cylinder, a nonrotatable element operatively engaging said second member whereby rotation of said second member will impart axial movement to said element, said piston being operatively engageable with said element whereby said element limits movement of said piston in one direction, locking means disposed within said cylinder and engageable with said first rotatable member to prevent rotation thereof and lock said piston against movement, and means operatively interconnecting said locking means and said second rotatable member whereby operative engagement of said piston with said element engages said locking means.

4. An actuator assembly including in combination, a cylinder, a reciprocable piston disposed in said cylinder, a first member rotatably journalled in said cylinder but restrained against axial movement, means operatively interconnecting said piston and said first member such that piston movement is dependent upon and effects rotation of said member, a second member rotatably journalled in said cylinder and supported for limited axial movement relative thereto, a nonrotatable element operatively engaging said second member whereby rotation of said second member will impart axial movement to said element, said piston being operatively engageable with said element for imparting axial movement to said second member and thereby limit movement of said piston in one direction, and locking means disposed within said cylinder and engageable with said first rotatable member upon axial movement of said second member to prevent rotation of said first rotatable member and lock the piston against movement.

5. The actuator assembly set forth in claim 4 wherein said locking means comprises a dog tooth member having a straight spline connection with said cylinder and connected for axial movement in one direction with said second rotatable member, and a complementary dog tooth member connected to said screw shaft.

6. The actuator assembly set forth in claim 5 including resilient means engaging said axially movable dog tooth member for disengaging said locking means.

7. An actuator assembly including in combination, a cylinder, a reciprocable piston disposed within said cylinder, adjustable stroke limiting means disposed within the cylinder and operatively engageable with said piston for limiting movement of said piston on one direction at any one of a plurality of preselected positions, locking means operatively associated with said piston to lock said piston against movement, and means operatively interconnecting said locking means and said stroke limiting means whereby operative engagement of said piston with said stroke limiting means engages said locking means.

8. An fluid pressure operated actuator including, a cylinder, a reciprocable piston disposed in said cylinder capable of fluid pressure actuation in both directions, said piston having a hollow rod extending outside of said cylinder with a closed outer end, a hollow screw shaft rotatably journalled in said cylinder and operatively connected to said piston whereby piston movement is dependent upon rotation of said hollow screw shaft, a second screw shaft coaxially disposed within said hollow screw shaft and said piston rod and supported for rotation relative to said cylinder, a nut threadedly engaging said screw shaft and restrained against rotation relative to said cylinder, said piston being operatively engageable with said nut whereby said nut limits movement of said piston in one direction, and means operable to rotate said second screw shaft and adjust the axial position of said nut to vary the stroke limit of said piston in said one direction.

9. The fluid pressure operated actuator set forth in claim 8 wherein said nut is disposed within said hollow piston rod and has a straight spline connection therewith.

10. The fluid pressure operated actuator set forth in claim 8 wherein said second screw shaft is supported for limited axial movement relative to said cylinder and said hollow screw shaft is restrained against axial movement relative to said cylinder, locking means engageable with said hollow screw shaft for restraining rotation thereof to lock the piston against movement, and means operatively interconnecting said locking means and said second screw shaft whereby operative engagement of said piston with said nut engages said locking means.

11. The fluid pressure operated actuator set forth in claim 8 wherein said piston rod includes internal abutment means engageable with said nut.

References Cited in the file of this patent

UNITED STATES PATENTS 1,651,036     Miller _____ Nov. 29, 1927